United States Patent [19]

Slazas

[11] 4,147,376
[45] Apr. 3, 1979

[54] RESILIENT HITCH LINKAGE FOR CONNECTION BETWEEN A TOWING VEHICLE AND A TOWED APPARATUS

[75] Inventor: John J. Slazas, Cedarburg, Wis.

[73] Assignee: Allis-Chalmers Corporation, Milwaukee, Wis.

[21] Appl. No.: 856,771

[22] Filed: Dec. 2, 1977

[51] Int. Cl.² .............................................. B60D 1/00
[52] U.S. Cl. ................................... 280/489; 172/678; 267/138
[58] Field of Search ........... 280/483-489, 481, 456 A, 280/456 R, 460 A, 460 R, 461 A, 461 R, 405 R, 405 B; 172/678, 449; 267/138

[56] References Cited

U.S. PATENT DOCUMENTS

| | | | |
|---|---|---|---|
| 1,754,309 | 4/1930 | Cowell | 267/138 |
| 2,973,817 | 3/1961 | Monthei | 172/678 X |
| 3,464,192 | 9/1969 | DeVries et al. | 280/489 X |
| 3,525,539 | 8/1970 | Illar | 280/483 |
| 3,588,145 | 6/1971 | Thompson | 280/489 X |

FOREIGN PATENT DOCUMENTS 1279484 10/1968 Fed. Rep. of Germany ........... 280/488

*Primary Examiner*—John A. Pekar
*Attorney, Agent, or Firm*—Robert C. Sullivan

[57] ABSTRACT

A resilient hitch linkage between a towing vehicle such as a tractor and an implement or attachment such as, for example, a rotary tiller, towed by the towing vehicle. The resilient hitch linkage serves to reduce the transmission of impact or shock loads and/or vibrations between the implement and the tractor and includes a front link pivotally connected to a hitch point on the tractor and a rear link pivotally connected to the attachment being towed. One of the pivoted links, such as the rear link, has a member with multiple flat exterior surfaces such as a member of rectangular cross section (a "square tube") secured thereto and extending laterally therefrom. The other pivoted link, such as the front link, has a first U-shaped clamp member secured thereto and lying on one side of the "square tube" carried by the one link. A pair of rubber cylinders are retained by the first clamp member. A second U-shaped clamp member is positioned on the opposite side of the "square tube" from the first clamp member, the second clamp member retaining a second pair of rubber cylinders therein. The two clamp members are fastened together to confine the plurality of rubber cylinders under pressure between the "square tube" and the clamp members, thereby defining a resilient connection between the front and rear link members. The rubber cylinders are deformed under the pressure exerted upon them. In the preferred embodiment, the resilient connection between the front and rear links is offset from the straight line connecting the respective pivotal connections of the front and rear links to the tractor and to the implement towed by the tractor, at least under normal operating conditions (i.e., in the absence of shock or impact loads). An upper and a lower resilient hitch linkage, each embodying a construction of the foregoing type is connected between the towing vehicle such as a tractor and the implement or attachment being towed by the tractor.

16 Claims, 4 Drawing Figures

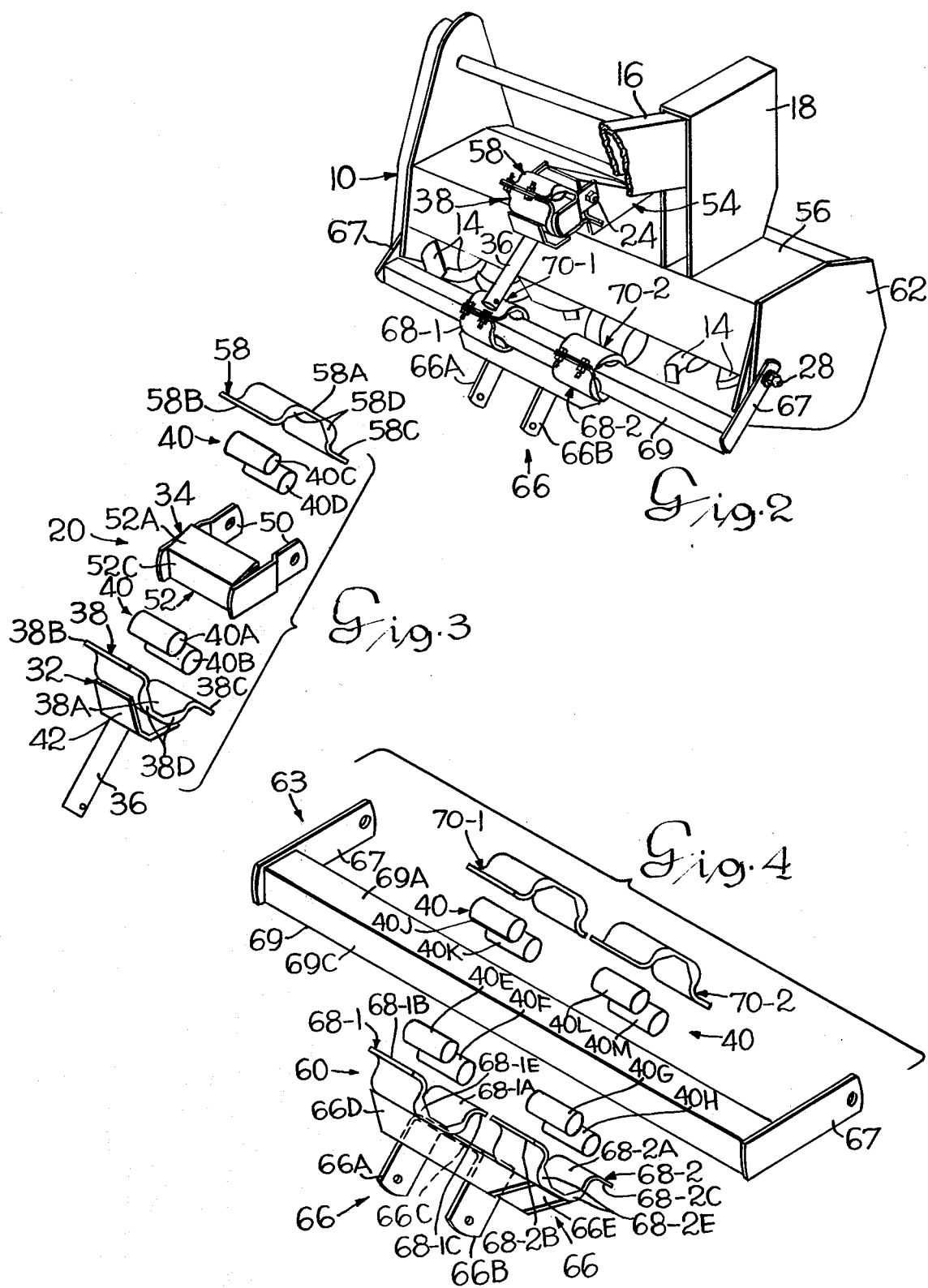

RESILIENT HITCH LINKAGE FOR CONNECTION BETWEEN A TOWING VEHICLE AND A TOWED APPARATUS

BACKGROUND OF THE INVENTION

1. Field of the Invention

This invention relates to a resilient hitch linkage between a towing vehicle such as a tractor and an implement or attachment mounted on or towed by the towing vehicle in which the resilient hitch linkage serves to reduce impact or shock loads and/or vibrations transmitted between the implement or attachment and the towing vehicle. In the specification which follows, the towing vehicle will be described as a tractor and the towed apparatus will be described as a rotary tiller. However, it will be understood that these are merely illustrative of typical types of towing and towed apparatus between which the resilient hitch linkage of the invention may be connected.

2. Statement of the Prior Art

In the prior art, to the best of my knowledge, it has been the practice to connect an implement or attachment, such as a rotary tiller, for example, to the back of a tractor by means of a hitch having a rigid linkage whereby any impact force or shock force such as might result, for example, when the implement strikes an object embedded in the ground, is transmitted from the implement or attachment to the tractor frame through the rigid linkage with possible structural damage to the tractor or discomfort to the operator of the tractor. Also, the rigid linkage of the prior art which connected the towed implement, such as a rotary tiller, to the tractor permitted the transmission of vibratory forces from the towed implement to the tractor even during normal operation (as distinguished from the transmission of shock or impact forces), frequently causing discomfort to the operator of the tractor even during normal towing operation.

It has been broadly known in the prior art to provide resilient connections between interrelated members. For example, it is known in the art relating to agricultural field cultivators to provide a resilient connection between the shank of a cultivator tool and the supporting frame or tool bar on which the cultivator tool is mounted, which permits the tool shank to flex in any direction as shown by U.S. Pat. No. 3,575,243 issued to Alexander H. Mark et al. on Apr. 20, 1971, and assigned to the same assignee as the present application.

STATEMENT OF THE INVENTION

Accordingly, it is an object of the present invention to provide a resilient hitch linkage for connecting an implement or attachment to a towing or propelling vehicle such as a tractor whereby to reduce the transmission of impact or shock loads and/or vibrations between the implement or attachment and the tractor.

It is a further object of the invention to provide a resilient hitch linkage between a towing vehicle such as a tractor and an implement being towed by the towing vehicle, whereby to minimize the transmission of impact loads or shock loads between the implement or attachment and the towing vehicle, and thereby minimizing the possibility of structural damage to the towing vehicle, as well as minimizing the possibility of operator discomfort which might be caused by the transmission of such impact or shock loads to the towing vehicle.

In achievement of these objectives there is provided in accordance with an embodiment of the invention a resilient hitch linkage between a towing vehicle such as a tractor, and an implement or attachment such as, for example, a rotary tiller towed by the towing vehicle. The resilient hitch linkage serves to reduce the transmission of impact or shock loads and/or vibrations between the implement and the tractor and includes a front link pivotally connected to a hitch point on the tractor and a rear link pivotally connected to the attachment being towed. One of the pivoted links, such as the rear link, has a member with multiple flat exterior surfaces such as a member of rectangular cross section (a "square tube") secured thereto and extending laterally therefrom. The other pivoted link, such as the front link, has a first U-shaped clamp member secured thereto and lying on one side of the "square tube" carried by the one link. Resilient or elastic cushioning means, such as a pair of rubber cylinders are retained by the first clamp member. A second U-shaped clamp member is positioned on the opposite side of the "square tube" from the first clamp member, the second clamp member also retaining therein resilient or elastic cushioning means such as a second pair of rubber cylinders. The two clamp members are fastened together to confine the plurality of rubber cylinders under pressure between the "square tube" and the clamp members, thereby defining a resilient connection between the front and rear link members. The rubber cylinders are deformed under the pressure exerted upon them. In the preferred embodiment, the resilient connection between the front and rear links is offset from the straight line connecting the respective pivotal connections of the front and rear links to the tractor and to the implement towed by the tractor, at least under normal operating conditions (i.e., in the absence of shock or impact loads). An upper and a lower resilient hitch linkage, each embodying a construction of the foregoing type is connected between the towing vehicle such as a tractor and the implement or attachment being towed by the tractor.

BRIEF DESCRIPTION OF THE DRAWINGS

Further objects and advantages of the invention will become apparent from the following description taken in conjunction with the accompanying drawings in which:

FIG. 2 is a perspective view of a rotary tiller which is adapted to be mechanically driven by and mounted behind the tractor, and showing the upper and lower resilient hitch linkages which are shown pivotally connected to the rotary tiller and which resilient hitch linkages are also adapted to be pivotally connected to hitch points on the tractor;

FIG. 3 is an exploded perspective view of the upper resilient hitch linkage adapted to be connected between the rotary tiller and the tractor of FIG. 1; and FIG. 4 is a perspective exploded view of the lower resilient hitch linkage adapted to be connected between the rotary tiller and the tractor of FIG. 1.

DESCRIPTION OF THE PREFERRED EMBODIMENT

Figure 1:
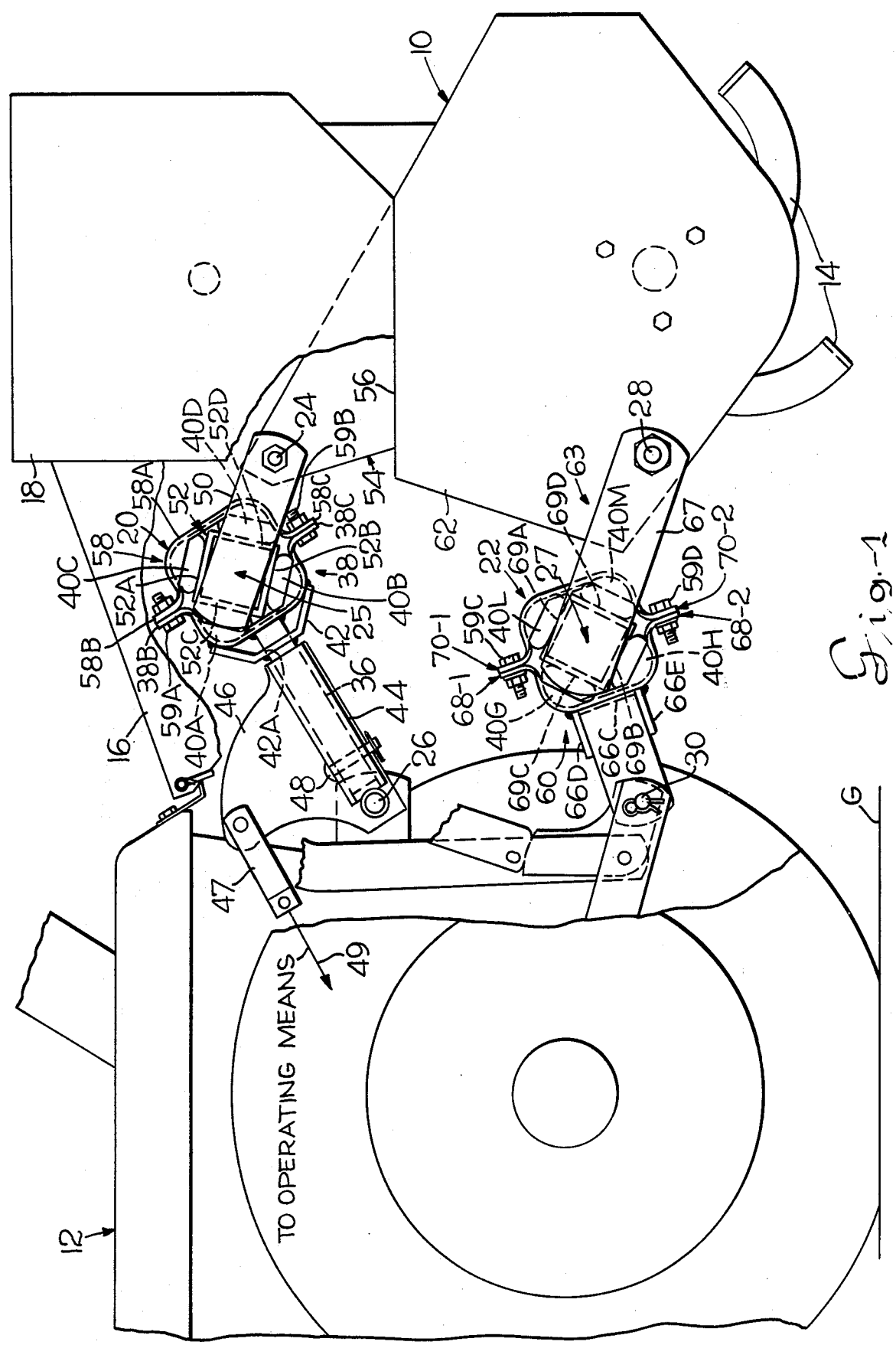
FIG. 1 is a side elevation view showing upper and lower resilient hitch linkages in accordance with the invention, each hitch linkage being respectively pivotally connected to an implement such as a rotary tiller and also pivotally connected to a tractor.

Referring now to the drawings, and more particularly to FIGS. 1-3, inclusive, there is shown a rotary tiller generally indicated at 10 which is adapted to be towed behind a tractor 12. Rotary tiller 10 includes a plurality of tines 14 which are rotatably driven by a power take-off from tractor 12. In the view of FIG. 1, rotary tiller 10 is shown raised to a "transport" position in which rotatable tines 14 are elevated above the ground surface G in a nontilling position. The power take-off which rotatably drives tines 14 includes a drive belt (not shown) which passes through a belt guard 16 (FIGS. 1 and 2), the drive belt engaging a drive pulley mounted within the upstanding housing 18 on rotary tiller 12. Rotary tiller 10 is connected to upper and lower hitch points 26 and 30, respectively, (FIG. 1) of the tractor by an upper hitch linkage assembly generally indicated at 20 and by a lower hitch linkage assembly generally indicated at 22. Upper hitch linkage assembly 20 is pivotally connected at 24 to the body of rotary tiller 10 and is pivotally connected at hitch point 26 to tractor 12. Lower hitch linkage assembly 22 is pivotally connected at point 28 to the lower portion of the body of rotary tiller 10 and is pivotally connected at hitch point 30 to the lower end of tractor 12.

As best seen in the exploded view of FIG. 3, the upper hitch linkage assembly generally indicated at 20 comprises a front link subassembly generally indicated at 32 for pivotal connection to tractor 12 and a rear link subassembly generally indicated at 34 for pivotal connection to rotary tiller 10.

Front link subassembly 32 of upper hitch linkage 20 includes a link 36 which is rigidly secured, as by welding, to a front clamp member 38. Clamp member 38 includes a cup-like recess portion indicated at 38A adapted to receive resilient or elastic cylinders generally indicated at 40 and specifically indicated at 40A and 40B formed of a suitable resilient elastic material such as rubber or of other suitable rubber-like or elastomeric material. Hereinafter in this specification for simplicity in description, the cylinders 40 will be referred to as "rubber cylinders. " However, it will be understood, as just mentioned, that cylinders 40 may be formed not only of rubber, but also of any suitable resilient or elastic material such as, for example, rubber-like or elastomeric material.

Front clamp member 38 also includes oppositely extending upper and lower flange portions 38B and 38C, respectively, on either side of U-shaped center clamp portion 38A. To retain rubber cylinder members 40A and 40B in cup-like recess 38A, a pair of web portions such as those indicated at 38D are provided at each of the opposite ends of cup-like central portion 38A of front clamp member 38. A brace member 42 is provided with a centrally located aperture 42A (FIG. 1) which permits brace member 42 to be received on front link 36 in abutting relation to the forwardly facing surface of front clamp 38. The rearwardly facing surface of brace member 42 is welded to the forwardly facing surface of front clamp 38. Brace member 42 is also welded to the surface of link member 36, whereby front clamp member 38, brace member 42 and front link 36 are all rigidly secured together.

In describing the various parts of the hitch linkage, the terms "front" and "rear" and "forward" and "rearward" are all relative to the orientation of the various parts of the hitch linkage relative to tractor 12. Thus, for example, "front" link 36 is closer to tractor 12 than "rear" links 50.

As best seen in FIG. 1, front link 36 is received in a sleeve-like member 44 which, in turn, is rigidly secured to or integral with a bell-crank type lift arm 46 which is pivotally mounted at hitch point 26 to the tractor structure. Front link 36 is detachably secured within sleeve 44 by means of a detachable pin member 48, whereby to facilitate either the connection or the disconnection of upper resilient hitch linkage 20 relative to tractor 12.

In the view of FIG. 1, lift arm 46 is shown rotated about tractor hitch point 26 in a counterclockwise direction whereby to raise rotary tiller 10 to a "transport" position in which tines 14 of rotary tiller 10 are elevated to a nontilling position above ground surface G. A link member 47 is pivotally connected to the upper end of lift arm 46, and a cable 49 is connected to link member 47 and also to a suitable operating means actuated by an electric motor (not shown) mounted on tractor 12. When it is desired to pivotally move lift arm 46 about tractor hitch point 26 to the transport position shown in the view of FIG. 1, the electric motor is activated to cause cable 49 to move lift arm 46 in a counterclockwise direction relative to the view of FIG. 1 about pivot point 26 to reach the "transport" position shown in FIG. 1. However, when it is desired to begin the tilling operation, cable 49 is released, permitting the force of gravity to move tiller 10 downwardly so that tines 14 are in ground-engaging position, lift arm 46 moving correspondingly in a clockwise direction (relative to FIG. 1) about pivotal connection 26 on the tractor. During the entire tilling operation, lift arm 46 is free to pivotally move about tractor hitch point 26 in accordance with the movements of upper hitch linkage 20, as caused by vertical movement of rotary tiller 10 due to undulations in the ground contour over which tiller 10 passes, or as caused by impact or shock loads on tiller 10.

If desired, cable 49 may be released by a controlled amount for the tilling operation or rotary tiller 10 whereby to limit the downward movement of rotary tiller 10 to a predetermined desired maximum. This would, of course, correspondingly limit to a predetermined maximum the clockwise pivotal movement (relative to FIG. 1) of lift arm 46 about tractor hitch point 26. However, except for this maximum limitation in a clockwise direction relative to FIG. 1, lift arm 46 would otherwise be able to freely pivot about tractor hitch point 26 in accordance with the undulations of the ground surface over which rotary tiller 10 moves.

Any other suitable mechanical, electrical or hydraulic means or suitable combinations thereof, and which form no part of the present invention, may be operatively connected to lift arm 46 to pivotally move lift arm 46 to the transport position shown in FIG. 1 and to retain lift arm 46 in the transport position of FIG. 1 as long as required, and to permit free pivotal movement of lift arm 46 about tractor hitch point 26 during the normal operation of the towed implement, such as the rotary tiller.

Rear link subassembly 34 of upper hitch linkage assembly 20 comprises a pair of laterally spaced link members each indicated at 50 which are respectively rigidly secured, as by welding, to the opposite ends of a square tube 52 having opposite upper and lower surfaces respectively indicated at 52A and 52B and oppositely disposed side wall surfaces respectively indicated at 52C and 52D (see FIG. 1).

As will be explained hereinafter, square tube 52 defines a multi-sided bearing member having a plurality of external flat surfaces against which a plurality of resilient or elastic members such as rubber cylinders 40 are pressed by clamp members 38 and 58 whereby to provide a resilient connection 25 between the respective front and rear links 36 and 50 of upper hitch linkage assembly 20.

The rearwardly facing ends of the oppositely disposed links 50 of rear link subassembly 34 are each adapted to be pivotally connected at 24 (FIG. 1) to laterally spaced sides of a mounting bracket 54 (FIGS. 1 and 2) which is mounted on upper wall 56 of rotary tiller 10.

Upper hitch linkage assembly 20 also includes a rear clamp member 58 which is adapted to be clamped into engagement with front upper clamp member 38 as best seen in the view of FIG. 1. Rear clamp member 58 is similar to front clamp member 38 and includes a generally U-shaped central portion 58A which is adapted to receive the two cylindrical-shaped rubber cylinders generally indicated at 40 and specifically indicated at 40C and 40D. Rear clamp member 58 includes oppositely disposed upper and lower flange portions 58B and 58C and web portions 58D at the opposite axial ends of U-shaped central portion 58A for the purpose of retaining rubber cylinders 40C and 40D against axial displacement relative to central portion 58A of rear clamp member 58, in the same manner as in the case of front clamp member 38.

Upper front link subassembly 32 including link 36, the attached front clamp 38 and brace 42 and the rubber cylinders 40A and 40B retained by front clamp 38 are secured in assembled relation with respect to upper rear link subassembly 34 and rubber cylinders 40C and 40D as shown in the view of FIG. 1, by securing upper flange portions 38B and 58B of upper front and rear clamps 38 and 58 together by means of bolts 59A and, similarly, by securing lower flange portions 38C and 58C of the respective upper front and upper rear clamps 32 and 58 together by means of bolts 59B, as best seen in FIG. 1. During the assembly process just described, rubber cylinders 40A, 40B, 40C and 40D are placed under compression with rubber cylinders 40A-40D, inclusive, being deformed in the assembly process.

With the upper front and rear linkage subassemblies connected to each other as shown in FIG. 1, rubber cylinders 40A and 40B respectively bear against flat surfaces 52C and 52B of "square tube" 52, and rubber cylinders 40C and 40D respectively bear against flat surfaces 52A and 52D of square tube 52.

The resilient connection between upper front link subassembly 32 and upper rear link subassembly 34 is defined by the cooperating front and rear clamps 38 and 58, the "square tube" 52, and the plurality of rubber cylinders 40 which are squeezed between the clamps and the square tube. The resilient connection just defined is generally indicated at 25.

The upper front and rear link subassemblies 32 and 34 are so angularly positioned with respect to each other that resilient connection 25 is offset from the straight line connecting the respective pivotal connections 26 and 24 of the upper hitch linkage to the tractor and to the implement, this offset condition prevailing at least under normal operating conditions (i.e., in the absence of shock or impact loads). In fact, depending upon the degree of "stiffness" of resilient connection 25, and upon the degree of offset of resilient connection 25 under normal operating conditions, the resilient connection 25 may remain in an offset relation even under shock or impact load conditions.

The lower resilient hitch linkage assembly generally indicated at 22 comprises a front link subassembly generally indicated at 60 which is pivotally connected to tractor 12 along the pivotal axis 30 and a rear link subassembly generally indicated at 63 which is pivotally connected to rotary tiller 10 along the pivotal axis 28. Front link subassembly 60 comprises a link member generally indicated at 66 of U-shape including a pair of laterally spaced link elements 66A and 66B which are pivotally secured to tractor 10 along the pivotal hitch connection axis 30 (FIG. 1). Link elements 66A and 66B are joined at the rear portions thereof by an integral bridging portion 66C. It should be noted that the use of the two link elements 66A, 66B to connect lower hitch linkage 22 to tractor 12 along hitch connection axis 30 is a stabilizing factor which prevents sidewise swaying or swinging of the towed apparatus such as rotary tiller 10 with respect to tractor 12. Front link subassembly 60 also includes an upper plate member 66D and lower plate member 66E which respectively lie in parallel planes to each other, with upper plate member 66D being in abutting relation to the upper edges of both link element 66A and 66B, and with lower plate member 66E being in abutting relation to the lower edges of both link elements 66A and 66B. Upper and lower plate members 66D and 66E are rigidly secured, as by welding to the U-shaped link member 66.

A first and a second clamp member respectively indicated at 68-1 and 68-2 are rigidly secured as by welding to the rearward edges of the respective upper and lower plate members 66D and 66E. It can therefore be seen that U-shaped link member 66 including the link elements 66A, 66B and the integral connecting portion 66C, together with the upper and lower plates 66D and 66E, and the two clamp members 68-1 and 68-2 are all one rigidly interconnected unitary subassembly.

Clamp member 68-1 includes a cup-like U-shaped portion 68-1A and a pair of oppositely disposed upper and lower flanges 68-1B and 68-1C. Similarly, the other clamp member 68-2 is provided with a cup-like centrally located U-shaped recess 68-2A and oppositely disposed upper and lower flanges 68-2B and 68-2C. Each of the respective clamp members 68-1 and 68-2 is provided with a pair of web-like portions such as those indicated at 68-1E and 68-2E is bounding relation to the axial ends of the U-shaped portions 68-1A and 68-2A of the respective clamp members 68-1 and 68-2 to prevent axial displacement of rubber cylinders 40 received by the U-shaped portions of the respective clamps. U-shaped recess 68-1A of clamp 68-1 is adapted to receive a pair of rubber cylinders 40E and 40F, and U-shaped recess 68-2A of clamp 68-2 is adapted to receive a pair of rubber cylinders 40G and 40H.

Rear linkage subassembly 63 of lower hitch linkage assembly 22 comprises a pair of laterally spaced link members each indicated at 67 and each pivotally connected to a corresponding one of the opposite end walls 62 of rotary tiller 10 about the pivotal axis 28. The forward end of the oppositely disposed spaced links 67 (i.e., the end of the links 67 closest to tractor 18) are rigidly secured to a "square tube" 69.

As in the case of square tube 52 of upper hitch linkage assembly 20, square tube 69 of the lower hitch linkage assembly 22 defines a multi-sided bearing member having a plurality of flat external surfaces against which a plurality of rubber cylinders 40 are pressed or squeezed by clamp members 68-1, 68-2, 70-1, 70-2 whereby to provide a resilient connection 27 between the respective front and rear links 66 and 67 of lower hitch linkage assembly 22. Lower resilient hitch linkage assembly 22 also includes a second pair of clamp members respectively indicated at 70-1 and 70-2 which are similar to clamps 68-1 and 68-2. Clamp 70-1 is adapted to receive rubber cylinders 40J and 40K, and clamp 70-2 is adapted to receive rubber cylinders 40L and 40M. Clamp 68-1, with rubber cylinders 40E and 40F received therein, and clamp 70-1 with rubber cylinders 40J and 40K received therein, are clamped together by means of bolts 59C, as best seen in the view of FIG. 1, with the respective rubber cylinders 40E and 40F being squeezed between clamp 68-1 and the surfaces 69C and 69B of square tube 69 and with the respective rubber cylinders 40J and 40K being squeezed between clamp 70-1 and the respective surfaces 69A and 69D of square tube 69. In a similar manner, clamp 68-2 with rubber cylinders 40G and 40H received in the U-shaped portion thereof is clamped by means of bolts 59D into engagement with clamp 70-2 which has rubber cylinders 40L and 40M received in the U-shaped portion thereof, so that the respective rubber cylinders 40G and 40H are squeezed between clamp 68-2 and the respective surfaces 69C and 69B of square tube 69, and so that the respective rubber cylinders 40L and 40M are squeezed between clamp 70-2 and the respective surfaces 69A and 69D of square tube 64. (See FIG. 1)

The resilient connection between lower front link subassembly 60 and lower rear link subassembly 63 is defined by the cooperating front and rear clamps, such as 68-1 and 70-1, the "square tube" 69, and the plurality of rubber cylinders 40 which are deformably squeezed between the clamps and the square tube. The resilient connection just defined is generally indicated at 27. Resilient connection 27 of the lower resilient hitch linkage is offset from a straight line between the pivotal connections 30 and 28 connecting the lower hitch linkage to the tractor and to the rotary tiller, in the same manner as described in connection with resilient connection 25 of the upper resilient hitch linkage.

DESCRIPTION OF OPERATION

When the mounted implement such as rotary tiller 10, for example, is acted upon by an impact force which would result, for example, when rotary tiller 10 strikes an object embedded in the ground, the reaction is transmitted to tractor 12 through upper and lower hitch linkages 20 and 22. Since upper and lower linkages 20 and 22 function in the same manner, the cycle of operation will be described only for the lower hitch linkage 22. The reaction force transmitted from rotary tiller 10 to tractor 12 is through the pivotal connections 28 and 30 of lower hitch linkage 22 to the rotary tiller and to the tractor, respectively. Since the resilient connection 27 between front link subassembly 60 and rear link subassembly 63 is offset from a straight line through the pivots 28 and 30, a force applied at pivots 28 and 30 will create a moment about resilient connection 27 causing the front and rear link subassemblies 60 and 63 to rotate about resilient connection 27 in such manner as to attempt to "straighten out" the lower hitch linkage. That is, front and rear link subassemblies 60 and 63 rotate relative to each other about an axis passing through the resilient connection 27 and extending transverse of the front-to-rear axis of the connected tractor and rotary tiller. The rotation of front and rear link subassemblies 60 and 63 about resilient connection 27 is resisted by the force required to deform rubber cylinders 40E, 40F, 40G, 40H, 40J, 40K, 40L and 40M, which form part of resilient connection 27 and which are confined under pressure between square tube 69 and the clamps 68-1 and 70-1 and 68-2 and 70-2 (FIG. 4). The resistance of resilient connection 27 to the rotation of front and rear link subassemblies 60 and 63 about resilient connection 27 creates a torsional reaction force which cushions the impact loads between the pivots 28 and 30. Resilient connection 27 also minimizes the transmission of vibrations from rotary tiller 10 to tractor 12.

The rate of the torsional reaction spring force or "stiffness" (i.e., the degree of deformation of the resilient members obtained for a given impact force) provided by the resilient connection 27 can be varied by varying (1) the geometry of rubber cylinders 40, such as the length or volume thereof;

(2) by varying the amount of preload applied to rubber cylinders 40. The amount of preload on rubber cylinders 40 is controlled by the spacing between the clamps and the "square tube," which therefore determines the extent to which rubber cylinders 40 are squeezed between the clamps and the "square tube." The spacing between the clamps and the "square tube" can be determined by controlling the manufacturing dimensions or shape of the clamps and can also be controlled during the assembly operation by controlling the degree to which the clamps are tightened into engagement with each other, as, for example, by the use of shims between the oppositely disposed clamps such as clamps 68-1 and 70-1 which are bolted into engagement with each other; and (3) by varying the distance by which the resilient connection 27 is offset from the straight line through the pivots 28 and 30.

The offset distance between resilient connection 27 and the straight line connecting pivot points 28 and 30 can be changed by varying the angle between front link 66 and rear link 67. This can be done, for example, by changing the angle at which rear links 67 are welded to the end of "square tube" 69. The rate of the torsional reaction spring force provided by resilient connection 25 of upper hitch linkage assembly 20 can be varied in a similar manner as just described for resilient connection 27. Oscillation of the respective resilient connections 25 and 27 in cushioning impact or shock loads is resisted by the inherent dampening effect of rubber cylinders 40.

In the foregoing specification, while reference has been made principally to the value of the resilient hitch linkage of the invention in minimizing the transmission of impact or shock loads and/or vibrations from the towed implement such as the rotary tiller to the towing apparatus such as the tractor, it is evident that the transmission of such forces will also be minimized in the opposite direction, namely, from the towing apparatus of the towed apparatus.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A resilient hitch linkage for connection between a towing apparatus and a towed apparatus and adapted to minimize the transmission of impact or shock loads and/or vibrations between said towing and said towed apparatus, said hitch linkage comprising a front link member adapted to be pivotally connected to said towing apparatus, and a rear link member adapted to be pivotally connected to said towed apparatus, a first clamp member mounted on one of said pivoted link members, a bearing member mounted on the other of said pivoted link members, said first clamp member being positioned contiguous and in facing but spaced relation to first surface means of said bearing member, a second clamp member positioned contiguous and in facing but spaced relation to second surface means of said bearing member, said first and said second surface means being located substantially opposite each other on said bearing member, each of said first and said second clamp members being contoured to receive a separate resilient cushioning means, separate resilient cushioning means received by each of said clamp members, said first and said second clamp members being secured to each other to confine said resilient cushioning means under pressure between said first surface means and said first clamp member and between said second surface means and said second clamp member, and thus whereby to define a resilient connection between said front and said rear pivoted link members.

2. A resilient hitch linkage as defined in claim 1 in which said resilient connection means permits rotation under impact or shock loading conditions, vibration or the like, of said front and said rear link members relative to each other about an axis which is tranverse of the front-rear axis of said towing and said towed apparatus, said transverse axis passing through said resilient connection means.

3. A resilient hitch linkage as defined in claim 1 in which said first and said second surface means are flat surfaces.

4. A resilient hitch linkage as defined in claim 1 in which at least under normal operating conditions (i.e., in the absence of shock or impact loads), the location of the resilient connection between said front link member and said rear link member is offset from a straight line connecting said first and second pivot points.

5. A resilient hitch linkage for connection between a towing apparatus and a towed apparatus and adapted to minimize the transmission of impact or shock loads and/or vibrations between said towing and said towed apparatus, said hitch linkage comprising a front link member adapted to be pivotally connected to said towing apparatus, and a rear link member adapted to be pivotally connected to said towed apparatus, a first clamp member mounted on one of said pivoted link members, a multiple-sided bearing member having a plurality of flat surfaces, said bearing member being mounted on the other of said pivoted link members, said first clamp member being positioned contiguous and in facing but spaced relation to a first plurality of sides of said bearing member, a second clamp member positioned contiguous and in facing but spaced relation to a second plurality of sides of said bearing member, said first plurality of sides being located substantially opposite said second plurality of sides, each of said first and said second clamp members being contoured to receive separate resilient cushioning means, separate resilient cushioning means received by each of said clamp members, said first and said second clamp members being secured to each other to confine said resilient cushioning means under pressure between said first clamp member and said first plurality of sides and between said second clamp member and said second plurality of sides, and thus whereby to define a resilient connection between said front and said rear pivoted link members.

6. A resilient hitch linkage as defined in claim 1 in which said multiple-sided bearing member is of rectangular cross section and includes four sides which define said rectangular cross section, each of said sides having a flat surface.

7. A resilient hitch linkage as defined in claim 1 in which at least under normal operating conditions (i.e., in the absence of shock or impact loads), the location of the resilient connection between said front link member and said rear link member is offset from a straight line connecting said first and second pivot points.

8. A resilient hitch linkage as defined in claim 6 in which said first clamp member receives resilient cushioning means which bear against a first and a second of said four sides of said bearing member and said second clamp member receives resilient cushioning means which bear against a third and a fourth of said four sides of said bearing member.

9. A resilient hitch linkage as defined in claim 5 in which said resilient cushioning means is of a elastic material.

10. A resilient hitch linkage as defined in claim 1 in which said resilient cushioning means comprises cylinders of elastic material.

11. A resilient hitch linkage for connection between a towing apparatus and a towed apparatus and adapted to minimize the transmission of impact or shock loads and/or vibrations between said towing and said towed apparatus, said hitch linkage comprising a front link member adapted to be pivotally connected to said towing apparatus, and a rear link member adapted to be pivotally connected to said towed apparatus, a first clamp member mounted on one of said pivoted link members, a multiple-sided bearing member mounted on the other of said pivoted link members, said bearing member being of rectangular cross section and including four flat sides which define said rectangular cross section, a second clamp member, said first clamp member being positioned in facing but spaced relation to a first and a second of said four sides of said bearing member, said second clamp member being positioned in facing but spaced relation to a third and a fourth of said four sides of said bearing member, each of said first and said second clamp members being contoured to receive separate resilient cushioning means, said first clamp member receiving resilient cushioning means which bear against said first and second of said sides of said bearing member, and said second clamp member receiving resilient cushioning means which bear against said third and fourth of said sides of said bearing member, said first and said second clamp members being secured to each other to confine said resilient cushioning means under pressure between said sides of said multiple-sided bearing member and said first and said second clamp members and thus whereby to define a resilient connection between said front and said rear pivoted link members.

12. A resilient hitch linkage as defined in claim 11 in which said resilient cushioning means is of a elastic material.

13. A resilient hitch linkage defined in claim 12 in which said resilient cushioning means comprises cylinders of elastic material.

14. A resilient hitch linkage as defined in claim 11 in which at least under normal operating conditions (i.e., in the absence of shock or impact loads), the location of the resilient connection between said front link member and said rear link member is offset from a straight line connecting said first and second pivot points.

15. In combination, a ground working implement adapted to be towed behind a towing apparatus, an upper resilient hitch linkage pivotally connected at one end thereof to said implement and adapted to be pivotally connected at an opposite end thereof to the towing apparatus, and a lower resilient hitch linkage pivotally connected at one end thereof to said implement and adapted to be pivotally connected at an opposite end thereof to the towing apparatus, said upper and said lower resilient hitch linkages each being adapted to minimize the transmission of impact or shock loads and/or vibrations between said ground working implement and the towing apparatus, each of said hitch linkages comprising a front link member adapted to be pivotally connected at a first pivot point to the towing apparatus, and a rear link member pivotally connected at a second pivot point to said ground working implement, said upper and said lower hitch linkages each comprising a first clamp member mounted on one of said pivoted link members and a bearing member mounted on the other of said pivoted link members, each of said first clamp members being positioned contiguous and in facing but spaced relation to first surface means of said bearing member of the respective hitch linkage, a corresponding second clamp member positioned contiguous and in facing but spaced relation to second surface means of said bearing member of each respective hitch linkage, said first and said second surface means of each respective bearing member being located substantially opposite each other on the respective bearing member, each of said first and said second clamp members of each hitch linkage being contoured to receive separate resilient cushioning means, separate resilient cushioning means received by each of said clamp members, said first and said second clamp members of each respective hitch linkage being secured to each other to confine the corresponding resilient cushioning means under pressure between said first surface means and said first clamp member of each respective hitch linkage and between said second surface means and said second clamp member of each respective hitch linkage and thus whereby to define a resilient connection between said front and said rear pivoted link members of each respective hitch linkage.

16. The combination defined in claim 15 in which at least under normal operating conditions (i.e., in the absence of shock or impact loads), the location of the resilient connection between said front link member and said rear link member of each respective hitch linkage is offset from a straight line connecting said first and said second pivot points of the respective hitch linkage.

* * * * *